United States Patent
Chaudhury et al.

(10) Patent No.: US 11,257,240 B2
(45) Date of Patent: Feb. 22, 2022

(54) ACCELERATED OBJECT LABELING USING PRIOR GEOMETRIC KNOWLEDGE

(71) Applicant: International Business Machines Corporation, Armonk, NY (US)

(72) Inventors: Subhajit Chaudhury, Kawasaki (JP); Daiki Kimura, Tokyo (JP); Asim Munawar, Ichikawa (JP); Ryuki Tachibana, Setagaya-ku (JP)

(73) Assignee: International Business Machines Corporation, Armonk, NY (US)

(*) Notice: Subject to any disclaimer, the term of this patent is extended or adjusted under 35 U.S.C. 154(b) by 98 days.

(21) Appl. No.: 16/666,448

(22) Filed: Oct. 29, 2019

(65) Prior Publication Data

US 2021/0125364 A1    Apr. 29, 2021

(51) Int. Cl.
   *G06T 7/62* (2017.01)
   *G06T 7/33* (2017.01)
   (Continued)

(52) U.S. Cl.
   CPC .............. *G06T 7/62* (2017.01); *G06K 9/3241* (2013.01); *G06K 9/42* (2013.01); *G06K 9/4642* (2013.01); *G06K 9/6212* (2013.01); *G06K 9/6256* (2013.01); *G06K 9/6271* (2013.01); *G06N 3/08* (2013.01); *G06T 7/33* (2017.01); *G06T 7/35* (2017.01); G06K 9/3216 (2013.01); G06K 9/3233 (2013.01); G06K 9/40 (2013.01);
   (Continued)

(58) Field of Classification Search
   CPC .... G06T 7/62; G06T 7/33; G06T 7/35; G06T 2210/12; G06K 9/6212; G06K 9/4642; G06K 2009/363; G06K 9/40; G06K 9/6271; G06K 9/3233; G06K 9/3216; G06K 9/3241; G06K 9/42; G06K 9/6256; G06K 2209/21; G06N 3/08; G06N 3/0454
   USPC .......................................................... 382/123
   See application file for complete search history.

(56) References Cited

U.S. PATENT DOCUMENTS

| | | |
|---|---|---|
| 8,897,550 B2 | 11/2014 | Tong |
| 10,192,117 B2 | 1/2019 | Loui |
| (Continued) | | |

OTHER PUBLICATIONS

Donadello, I., Serafini, L. "Compensating Supervision Incompleteness with Prior Knowledge in Semantic Image Interpretation," 2019 International Joint Conference on Neural Networks (IJCNN), Budapest, Hungary, 2019, pp. 1-8, doi: 10.1109/IJCNN.2019.8852413 (Year: 2019).*

(Continued)

*Primary Examiner* — Nay A Maung
*Assistant Examiner* — Daniella M. DiGuglielmo
(74) *Attorney, Agent, or Firm* — Stephanie L. Carusillo

(57) ABSTRACT

In an approach for propagating labels of objects in an image, a processor receives the image. A processor performs a normalization of the image. A processor runs the image through a pre-trained object detector. A processor receives a set of detected objects from the pre-trained object detector. A processor determines a width dimension and a height dimension of a bounding box for each detected object of the set of detected objects. A processor propagates a label for each instance of each detected object in the image with the respective bounding box using prior geometric knowledge of bounding box placement. A processor inverses the normalization of the labeled image. A processor outputs the labeled image.

17 Claims, 4 Drawing Sheets

(51) Int. Cl.
*G06T 7/35* (2017.01)
*G06K 9/62* (2006.01)
*G06N 3/08* (2006.01)
*G06K 9/46* (2006.01)
*G06K 9/32* (2006.01)
*G06K 9/42* (2006.01)
*G06K 9/40* (2006.01)
*G06K 9/36* (2006.01)
*G06N 3/04* (2006.01)

(52) U.S. Cl.
CPC ... *G06K 2009/363* (2013.01); *G06K 2209/21* (2013.01); *G06N 3/0454* (2013.01); *G06T 2210/12* (2013.01)

(56) References Cited

U.S. PATENT DOCUMENTS

| | | | |
|---|---|---|---|
| 2013/0243309 | A1* | 9/2013 | Tong ........................ G06K 9/66 382/159 |
| 2019/0066268 | A1* | 2/2019 | Song ........................ G06N 3/08 |
| 2019/0197196 | A1* | 6/2019 | Yang ........................ G06F 30/00 |
| 2020/0142422 | A1* | 5/2020 | Valois ................ G06K 9/00805 |
| 2020/0193222 | A1* | 6/2020 | Singh ................... G06K 9/6255 |
| 2020/0410287 | A1* | 12/2020 | Chu ................... G06K 9/00536 |
| 2021/0027098 | A1* | 1/2021 | Ge ....................... G06K 9/6262 |

OTHER PUBLICATIONS

Crum WR, Hartkens T, Hill DL. Non-rigid image registration: theory and practice. Br J Radiol. 2004;77 Spec No. 2:S140-53. doi: 10.1259/bjr/25329214. PMID: 15677356. (Year: 2004).*

J. Lee, J. Bang and S. Yang, "Object detection with sliding window in images including multiple similar objects," 2017 International Conference on Information and Communication Technology Convergence (ICTC), 2017, pp. 803-806, doi: 10.1109/ICTC.2017.8190786. (Year: 2017).*

Ries, C.X., Richter, F., Lienhart, R., "Towards automatic object annotations from global image labels", ICMR '13: Proceedings of the 3rd ACM conference on International conference on multimedia retrieval, Apr. 2013, pp. 207-214, https://doi.org/10.1145/2461466.2461501 (Year: 2013).*

Tonioni, A., Serra, E., Di Stefano, L, "A deep learning pipeline for product recognition on store shelves", arXiv.org, Jan. 2019, pp. 1-9, https://arxiv.org/abs/1810.01733v3 (Year: 2019).*

"Alp's Labeling Tools for Deep Learning (ALT)", Wordpress, <https://alpslabel.wordpress.com/>, Jan. 26, 2017, 3 pages.

"Build computer vision products for the real world.", lb, Labelbox, <http://labelbox.com/>, printed Jul. 31, 2019, 8 pages.

"Image Annotation Tool", ImgLab, <https://imglab.in/>, printed Jul. 31, 2019, 1 page.

"ML data annotations made super easy for teams." DataTurks, <http://dataturks.com/>. University of Toronto, Printed Jul. 31, 2019, 9 pages.

Durand et al., "Learning a Deep ConvNet for Multi-Label Classification with Partial Labels", arXiv:1902.09720v1 [cs.CV] Feb. 26, 2019, <https://arxiv.org/pdf/1902.09720.pdf>, 30 pages.

Tang et al., "Visual and Semantic Knowledge Transfer for Large Scale Semi-Supervised Object Detection", IEEE Transactions on Pattern Analysis and Machine Intelligence, vol. 40, Issue: 12, 2018, 13 pages.

* cited by examiner

| | User 1 (time in secs) | | User 1 (clicks) | | User 2 (Time in secs) | | User 2 (clicks) | | Average user time for labeling | Overhead Time for pre-processing | Total time |
|---|---|---|---|---|---|---|---|---|---|---|---|
| | Time (baseline) | Time (proposed) | Number of clicks (baseline) | Number of clicks (proposed) | Time (baseline) | Time (proposed) | Number of clicks (baseline) | Number of clicks (proposed) | | | |
| Image 1 | 85.0 | 34.0 | 46 | 30 | 75.0 | 30 | 46 | 23 | 32.0 | 5.3 | 37.3 |
| Image 2 | 55.0 | 20.0 | 27 | 16 | 56.0 | 20 | 28 | 14 | 20.0 | 5.8 | 25.8 |
| Image 3 | 63.0 | 35.0 | 38 | 29 | 70.0 | 28 | 39 | 24 | 31.5 | 5.6 | 37.1 |
| Image 4 | 51.0 | 36.0 | 36 | 28 | 71.0 | 37 | 40 | 26 | 36.5 | 5.4 | 41.9 |
| Average | 63.5 | 31.43 | 36.75 | 25.75 | 68.3 | 28.5 | 38.25 | 21.75 | 30.0 | | 35.5 |

FIG. 3

ACCELERATED OBJECT LABELING USING PRIOR GEOMETRIC KNOWLEDGE

BACKGROUND

The present invention relates generally to the field of object labeling, and more particularly to accelerated object labeling using prior geometric knowledge.

Object detection and labeling is the process of finding and identifying objects in image and/or video data. Object detection and labeling can be done using deep learning tools and techniques. Object labeling may employ crowdsourcing to individually label the location of each object in an image.

SUMMARY

Aspects of an embodiment of the present invention disclose a method, computer program product, and computer system for propagating labels of objects in an image. A processor receives the image. A processor performs a normalization of the image. A processor runs the image through a pre-trained object detector. A processor receives a set of detected objects from the pre-trained object detector. A processor determines a width dimension and a height dimension of a bounding box for each detected object of the set of detected objects. A processor propagates a label for each instance of each detected object in the image with the respective bounding box using prior geometric knowledge of bounding box placement. A processor inverses the normalization of the labeled image. A processor outputs the labeled image.

BRIEF DESCRIPTION OF THE DRAWINGS

FIG. 3 depicts a chart of experimental results for labeling repeated objects in an image, in accordance with an embodiment of the present invention.

DETAILED DESCRIPTION

Embodiments of the present invention recognize that many real-world applications of objection detection/classification require supervised training on specific datasets for fine-tuned performance. Supervised training using deep learning tools typically requires a lot of labeled data that is usually done by crowdsourcing, which is expensive and time-consuming. For repeated objects in images, existing tools for object labeling can be inefficient and time-consuming because every instance of an object must be manually labeled. Embodiments of the present invention leverage human-knowledge about an arrangement of objects in an image to spread a few annotated examples to all instances of the object in the image. Embodiments of the present invention provide an accelerated method of data labeling that exploits prior geometric knowledge for object annotation in computer vision systems. Embodiments of the present invention utilize pre-trained object detections and prior geometric knowledge of object location to efficiently propagate labels for faster object instance annotations.

The present invention will now be described in detail with reference to the Figures.

Figure 1:
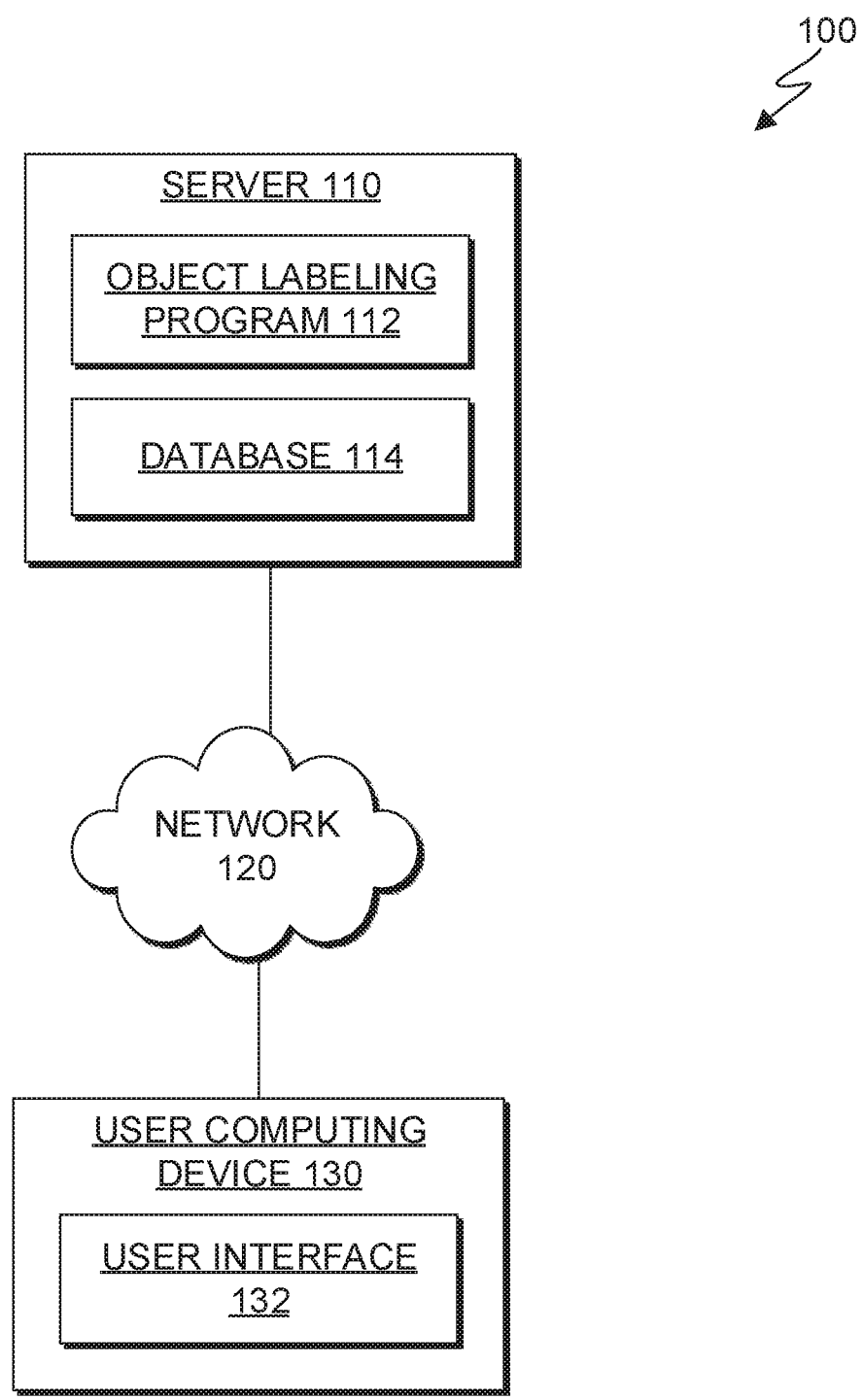
FIG. 1 depicts a block diagram of an object labeling computing environment, in accordance with an embodiment of the present invention.

FIG. 1 depicts a functional block diagram illustrating object labeling computing environment 100, in accordance with an embodiment of the present invention. FIG. 1 provides only an illustration of one embodiment of the present invention and does not imply any limitations with regard to the environments in which different embodiments may be implemented. In the depicted embodiment, object labeling computing environment 100 includes server 110 and computing device 130 interconnected over network 120. Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server 110 and computing device 130. Object labeling computing environment 100 may include additional servers, computers, or other devices not shown.

Server 110 operates to run object labeling program 112 and store and/or send data using database 114. In the depicted embodiment, server 110 houses object labeling program 112 and database 114. In other embodiments (not shown), object labeling program 112 and database 114 may be housed on separate computing devices. In some embodiments, server 110 may be a management server, a web server, or any other electronic device or computing system capable of receiving and sending data. In some embodiments, server 110 may be a laptop computer, tablet computer, netbook computer, personal computer (PC), a desktop computer, a smart phone, or any programmable electronic device capable of communicating with computer device 130 via network 120. In other embodiments, server 110 represents a server computing system utilizing multiple computers as a server system, such as in a cloud computing environment. Server 110 may include components as described in further detail in FIG. 4.

Object labeling program 112 operates as a program for accelerated object labeling using prior geometric knowledge. In an embodiment, object labeling program 112 receives an image. In an embodiment, object labeling program 112 normalizes the image to a pre-set geometric distribution. In an embodiment, object labeling program 112 runs the image through a pre-trained object detector. In an embodiment, object labeling program 112 removes outlier detections based on prior geometric knowledge. In an embodiment, object labeling program 112 performs accelerated labeling of objects in the image using prior geometric knowledge. In an embodiment, object labeling program 112 inverses the normalization of the image. In an embodiment, object labeling program 112 outputs the labeled image. In the depicted embodiment, object labeling program 112 resides on server 110. In other embodiments, object labeling program 112 may reside on another computing device (not shown), provided that object labeling program 112 has access to network 120.

Database 114 operates as a repository for data received, used, and/or output by object labeling program 112. Data received, used, and/or generated by object labeling program 112 may include, but is not limited to, an image, and any data related to the image, received by object labeling program 112; a labeled image, and any data related to the labeled image, output by object labeling program 112; prior geometric knowledge and/or arrangement of object(s) used by object labeling program 112 that can be pre-set by a user through user interface 132; a histogram that shows the most frequently observed height and width of the detected bounding boxes by the pre-trained object detector, which is updated for each image input into the system; and any other data used by object labeling program 112. Database 114 can be implemented with any type of storage device capable of storing data and configuration files that can be accessed and utilized by server 110, such as a database server, a hard disk drive, or a flash memory. In an embodiment, database 114 is accessed by object labeling program 112, server 110, and/or user computing device 130 to store and/or to access the data. In the depicted embodiment, database 114 resides on server 110. In another embodiment, database 114 may reside elsewhere within object labeling computing environment 100, provided that database 114 has access to network 120.

User computing device 130 operates to run user interface 132 through which a user can input an image, set pre-set values, select objects to label in the image, and/or view the output labeled image. In some embodiments, user computing device 130 may be, but is not limited to, an electronic device, such as a laptop computer, a tablet computer, a netbook computer, a personal computer (PC), a desktop computer, a smart phone, or any programmable electronic device capable of running user interface 132 and communicating (i.e., sending and receiving data) with server 110 and object labeling program 112 via network 120. In some embodiments, user computing device 130 represents one or more programmable electronic devices or combination of programmable electronic devices capable of executing machine readable program instructions and communicating with server 110 and/or other computing devices (not shown) within object labeling computing environment 100 via a network, such as network 120. In an embodiment, user computing device 130 represents one or more devices associated with a user. In the depicted embodiment, user computing device 130 includes an instance of user interface 132. User computing device 130 may include components as described in further detail in FIG. 4.

User interface 132 operates as a local user interface on user computing device 130 through which a user can input an image, input a geometric distribution for the image, input pre-set geometric knowledge and/or arrangement of object(s) in the image, select objects to label in the image, and/or view the output labeled image. In some embodiments, user interface 132 is a graphical user interface (GUI), a web user interface (WUI), and/or a voice user interface (VUI) that can display (i.e., visually) or present (i.e., audibly) alerts including information (such as graphics, text, and/or sound) sent from object labeling program 112 to a user via network 120. In an embodiment, user interface 132 enables a user to input an image, input a geometric distribution for the image, input pre-set geometric knowledge and/or arrangement of object(s) in the image, select objects to label in the image, and/or view the output labeled image. In an embodiment, user interface 132 is capable of sending and receiving data (i.e., to and from object labeling program 112 via network 120, respectively).

Figure 2:
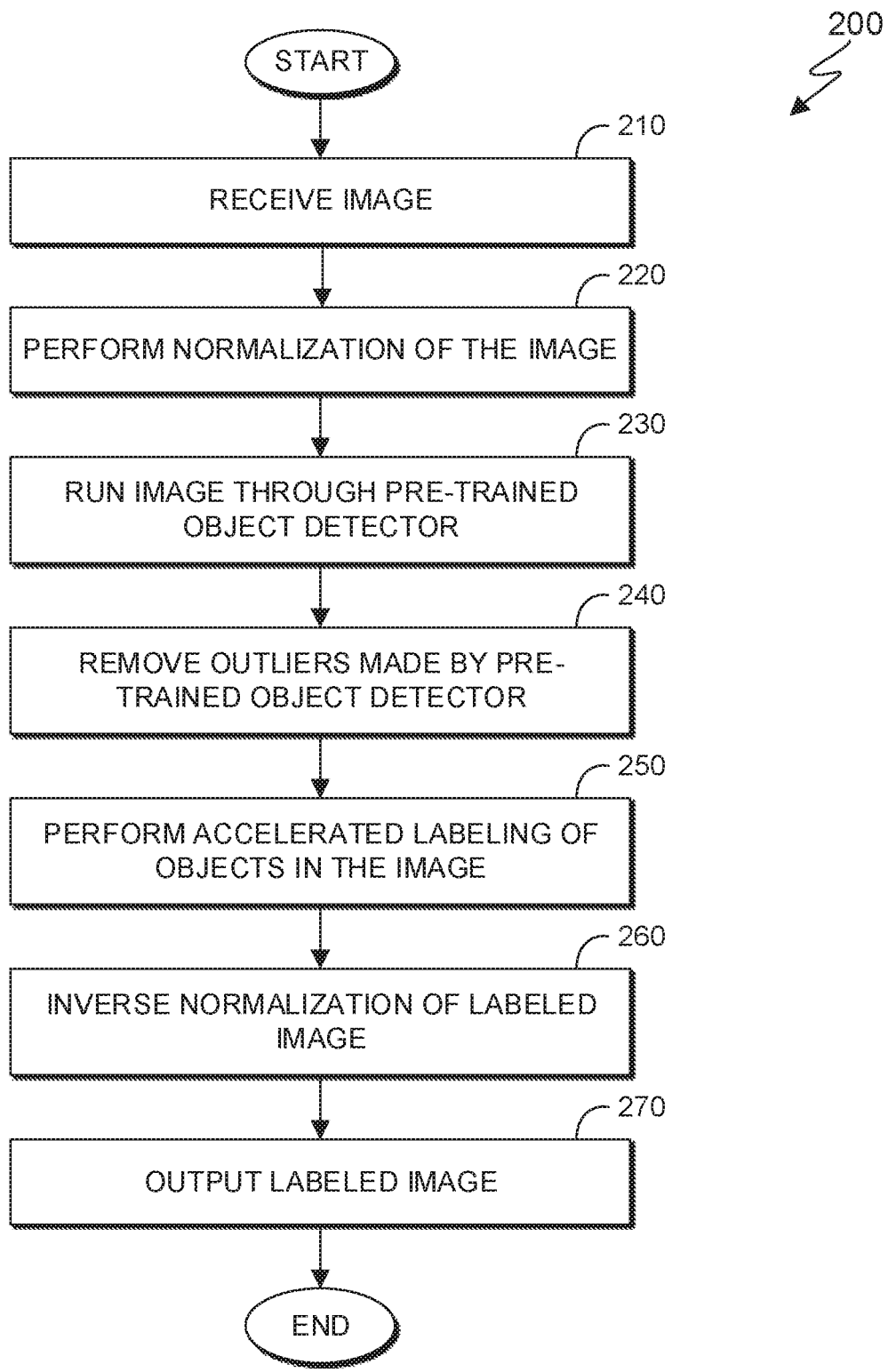
FIG. 2 depicts a flow chart of the steps of an object labeling program, in accordance with an embodiment of the present invention.

FIG. 2 depicts a flowchart 200 of the steps of object labeling program 112, in accordance with an embodiment of the present invention. In the depicted embodiment, object labeling program 112 receives an image, performs a normalization of the image, runs the image through a pre-trained object detector, removes outlier detections based on prior geometric knowledge, performs accelerated labeling of objects in the image using prior geometric knowledge, inverses the normalization of the image, and outputs the labeled image. It should be appreciated that the process depicted in FIG. 2 illustrates one possible iteration of the process flow, which repeats for each image received by object labeling program 112.

In step 210, object labeling program 112 receives an image. In an embodiment, object labeling program 112 receives an image input by a user through user interface 132 on user computing device 130. In an embodiment, object labeling program 112 receives an image from database 114. In an embodiment, object labeling program 112 receives a geometric distribution for the image pre-set by a user through user interface 132. In an embodiment, object labeling program 112 receives prior geometric knowledge and/or arrangement of object(s) in the image pre-set by a user through user interface 132.

In step 220, object labeling program 112 performs a normalization of the image. In an embodiment, object labeling program 112 performs a normalization of the image to a pre-set geometric distribution, i.e., through perspective correction. For example, object labeling program 112 normalizes the image using affine transformation to correct the perspective distortion of the image. In an embodiment, object labeling program 112 normalizes the image to the pre-set geometric distribution received from a user through user interface 132. In an embodiment, object labeling program 112 performs a normalization of the image by applying a pre-processed spatial distortion of the image to conform the image to fit the prior geometric knowledge received in step 210.

In step 230, object labeling program 112 runs the image through a pre-trained object detector. In an embodiment, object labeling program 112 runs the image through a pre-trained object detector that is trained on a dataset of images that has labeled instances of desired objects. The pre-trained object detector gives the location of objects in an image based on the dataset the detector is trained on. In an embodiment, a parameter of the pre-trained object detector is learned on a labeled image dataset that gives a set of locations of a set of bounding boxes, which are labels of detected objects. An example of a pre-trained object detector used in an embodiment of the present invention is You Only Look Once (YOLO)®, which is a state-of-the-art, real-time object detection system. Typically, there is a high domain gap between the dataset the pre-trained detector was trained on and the images run through the detector during application, so the pre-trained object detector can output outlier detections and can miss detections making steps 240 and 250 necessary. In an embodiment, object labeling program 112 receives, from the pre-trained object detector, a set of detected objects for the image.

In step 240, object labeling program 112 removes outlier detections made by pre-trained object detector. In an embodiment, object labeling program 112 removes outlier detections made by pre-trained object detector in step 230. In an embodiment, object labeling program 112 reviews the set of detected objects for the image received from the pre-trained object detector. In an embodiment, object labeling program 112 uses a histogram that is a statistical measure of the most frequently observed heights and widths of a set of detected bounding boxes for the set of detected objects by the pre-trained object detector, which is updated for each image input into object labeling program 112. A bounding box is a rectangular area, with height and width dimensions, in an image outlining where a desired/detected object is located and acts as a label. In an embodiment, object labeling program 112 uses the histogram to keep only the bounding boxes that have dimensions similar to the average height and weight statistics in the histogram. In an embodiment, object labeling program 112 uses a histogram stored in database 114 to remove outlier detections of objects that are outliers to the most frequently observed heights and widths of objects in the histogram. In an embodiment, object labeling program 112 removes outlier detections with less probable feature distributions of the detected object.

In step 250, object labeling program 112 performs accelerated labeling of objects in the image. In an embodiment, object labeling program 112 performs accelerated labeling of objects in the image by determining height and width dimensions of a bounding box for a first instance of each desired object based on a histogram and then propagating the bounding box using prior geometric knowledge of bounding box placement to every instance of the object in the image.

In an embodiment, object labeling program 112 performs accelerated labeling propagation for an even arrangement of objects. In an embodiment, object labeling program 112 performs accelerated labeling of one or more objects using a propagation of bounding boxes. A bounding box is a rectangular area, with height and width dimensions, in an image outlining where a desired object is located and acts as a label. In an embodiment, object labeling program 112 determines the height and width dimensions of at least one bounding box based on the histogram. In an embodiment, object labeling program 112 determines the average height and width dimensions of bounding boxes based on the histogram and filters the bounding boxes which are closest to the commonly occurring height and width dimensions. In an embodiment, object labeling program 112 identifies a bounding box using (x, y, w, h), in which (x,y) are the coordinates for the center of the bounding box and (w,h) represent the width and height of the bounding box. In an embodiment, a bounding box may be identified with respect to another bounding box as (x+dx,y,w,h), in which the horizontal location has shifted by dx amount. In another embodiment, a bounding box may be identified with respect to another bounding box as (x, y+dy,w,h), in which the vertical location has shifted by dy amount.

In an embodiment, object labeling program 112 propagates bounding boxes based on prior geometric knowledge of bounding box placement, i.e., a geometric arrangement of objects in an image. For example, for an image of products in a vending machine, object labeling program 112 propagates the bounding boxes based on the rectangular arrangement of products in the vending machine image. In an embodiment, object labeling program 112 propagates bounding boxes by choosing a template bounding box with height $h_0$ and width $w_0$, finding a number N of small bounding boxes that fit a drag area W in which $$N = \frac{W}{w_0},$$

finding a gap between boxes using $$dw = \frac{W}{N},$$

and constraining the propagated bounding boxes using equation (1) below.

$$x_i = x_0 + i*dw, \text{ s.t. } y_i = y_0 \quad (1)$$

In another embodiment, object labeling program 112 performs accelerated labeling propagation for an uneven arrangement of objects. In another embodiment, object labeling program 112 performs accelerated labeling propagation for an uneven arrangement of objects using feature matching with a reference image. In this embodiment, object labeling program 112 received the reference image in step 210 when the image being labeled is received. In an embodiment, object labeling program 112 finds reference features, $\phi_{ref} = f_\phi(x_{ref})$, uses process (2) to determine region proposals, and performs non-maximum-suppression on a heat map created to detect the bounding box for the detected object. In this process, the image is broken into different small parts and features are extracted from each small part, the features are matched to the reference feature $\phi_{ref}$ for all the parts, and the features that match well get a high score and the features that don't match well get a low score creating the heat map.

for i in 1 to h:
  for j in 1 to w:

(i) Crop the area around the pixel (i,j)

(ii) Compute score, $S_{ij} = (\phi_{ref}, \phi_{ij})$ (2)

In step 260, object labeling program 112 inverses the normalization of the image. In an embodiment, object labeling program 112 inverses the normalization done in step 220 of the now labeled image. For example, object labeling program 112 inverses the affine transformation of the image done in step 220. In another example, object labeling program 112 inverses the perspective correction done on the image in step 220.

In step 270, object labeling program 112 outputs the labeled image. In an embodiment, object labeling program 112 outputs the labeled image to a user through user interface 132 on user computing device 130. In an embodiment, object labeling program 112 outputs the labeled image to another computing device (not shown).

FIG. 3 depicts a chart 300 of experimental results for labeling repeated objects in an image, in accordance with an embodiment of the present invention. Chart 300 shows experimental results for labeling vending machine bottles using object labeling program 112 as described in FIG. 2 (labeled as proposed) versus a baseline method, in which a drag-and-drop template bounding box is used on each object in which a user clicks on the object center. For user 1, the average time decreases from 63.5 sec to 31.43 sec and the average number of clicks decreases from 36.75 to 25.75. For user 2, the average time decreases from 68.3 sec to 28.5 sec and the average number of clicks decreases from 38.25 to 21.75. Chart 300 shows a 54.5% reduction without overhead and a 46.13% reduction with overhead in labeling time compared to the baseline method.

Figure 4:
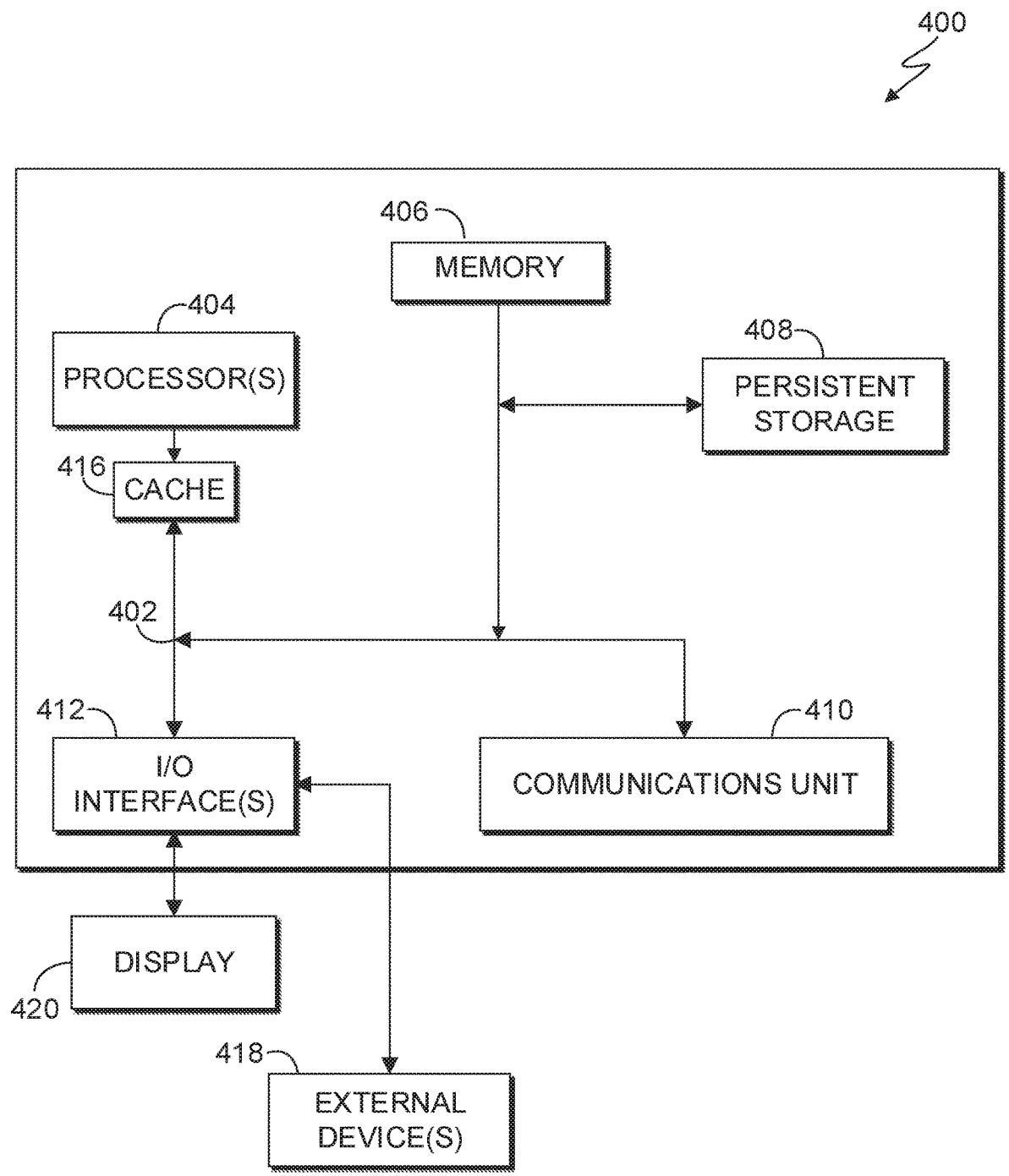
FIG. 4 depicts a block diagram of a computing device of object labeling computing environment, in accordance with an embodiment of the present invention.

FIG. 4 depicts a block diagram of computer 400 suitable for server 110 and user computing device 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Object labeling program 112 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs, such as object labeling program 112, may be downloaded to persistent storage 408 through communications unit 410.

I/O interface(s) 412 allows for input and output of data with other devices that may be connected to computing device 130 and server 110. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Object labeling program 112 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for propagating labels of objects in an image, executed by one or more processors, the method comprising:
   receiving, by one or more processors, the image;
   performing, by one or more processors, a normalization of the image;
   running, by one or more processors, the image through a pre-trained object detector;
   receiving, by one or more processors, a set of detected objects from the pre-trained object detector;
   determining, by one or more processors, a width dimension and a height dimension of a bounding box for a first instance of each detected object of the set of detected objects based on a histogram, wherein the histogram is a statistical measure of the most frequently observed heights and widths of a set of bounding boxes for the set of detected objects;
   propagating, by one or more processors, the respective bounding box that is associated with the first instance of the respective detected object to each instance of the object in the image using prior knowledge of a geometric arrangement of objects in the image, wherein the geometric arrangement of objects in the image is a rectangular arrangement a nd propagating the respective bounding box comprises:
   choosing, by one or more processors, a template bounding box with height $h_0$ and width $w_0$,
   finding, by one or more processors, a number N of small bounding boxes that fit a drag area W in which $$N = \frac{W}{w_0},$$

finding, by one or more processors, a gap between boxes using $$dw = \frac{W}{N},$$

and
   constraining, by one or more processors, the propagated bounding boxes using $x_i = x_0 + i*dw$ subject to $y_i = y_0$;
   inversing, by one or more processors, the normalization of the image; and
   outputting, by one or more processors, a labeled image.

2. The method of claim 1, wherein the normalization of the image applies pre-processed spatial distortion of the image to conform the image to fit the prior knowledge.

3. The method of claim 1, wherein a parameter of the pre-trained object detector is learned on a second labeled image dataset for getting a set of locations of a set of bounding boxes.

4. The method of claim 1, further comprising:
   removing, by one or more processors, one or more outlier detections from the set of detected objects based on the histogram.

5. The method of claim 1, wherein the prior knowledge is pre-set by a user through a user interface.

6. The method of claim 1, wherein outputting the labeled image comprises:
   sending, by one or more processors, the labeled image to a user computing device.

7. A computer program product for propagating labels of objects in an image, the computer program product comprising:
one or more computer readable storage media and program instructions stored on the one or more computer readable storage media, the program instructions comprising:
program instructions to receive the image;
program instructions to perform a normalization of the image;
program instructions to run the image through a pre-trained object detector;
program instructions to receive a set of detected objects from the pre-trained object detector;
program instructions to determine a width dimension and a height dimension of a bounding box for a first instance of each detected object of the set of detected objects based on a histogram, wherein the histogram is a statistical measure of the most frequently observed heights and widths of a set of bounding boxes for the set of detected objects;
program instructions to propagate the respective bounding box that is associated with the first instance of the respective detected object to each instance of the object in the image using prior knowledge of a geometric arrangement of objects in the image; wherein the geometric arrangement of objects in the image isa rectangular arrangement and the program instructions to propagate the respective bounding box comprise:
program instructions to choose a template bounding box with height $h_0$ and width $w_0$,
program instructions to find a number N of small bounding boxes that fit a drag area W in which $$N = \frac{W}{w_0},$$

program instructions to find a gap between boxes using $$dw = \frac{W}{N},$$

and
program instructions to constrain the propagated bounding boxes using $x_i = x_0 + i*dw$ subject to $y_i = y_0$;
program instructions to inverse the normalization of the image; and
program instructions to output a labeled image.

8. The computer program product of claim 7, wherein the normalization of the image applies pre-processed spatial distortion of the image to conform the image to fit the prior knowledge.

9. The computer program product of claim 7, wherein a parameter of the pre-trained object detector is learned on a second labeled image dataset for getting a set of locations of a set of bounding boxes.

10. The computer program product of claim 7, further comprising:
program instructions to remove one or more outlier detections from the set of detected objects based on the histogram.

11. The computer program product of claim 7, wherein the prior knowledge is pre-set by a user through a user interface.

12. The computer program product of claim 7, wherein the program instructions to output the labeled image comprise:
program instructions to send the labeled image to a user computing device.

13. A computer system for propagating labels of objects in an image, the computer system comprising:
one or more computer processors;
one or more computer readable storage media;
program instructions stored on the computer readable storage media for execution by at least one of the one or more processors, the program instructions comprising:
program instructions to receive the image;
program instructions to perform a normalization of the image;
program instructions to run the image through a pre-trained object detector;
program instructions to receive a set of detected objects from the pre-trained object detector;
program instructions to determine a width dimension and a height dimension of a bounding box for a first instance of each detected object of the set of detected objects based on a histogram, wherein the histogram is a statistical measure of the most frequently observed heights and widths of a set of bounding boxes for the set of detected objects;
program instructions to propagate the respective bounding box that is associated with the first instance of the respective detected object to each instance of the object in the image using prior knowledge of a geometric arrangement of objects in the image; wherein the geometric arrangement of objects in the image is a rectangular arrangement and the program instructions to propagate the respective bounding box comprise:
program instructions to choose a template bounding box with height $h_0$ and width $w_0$,
program instructions to find a number N of small bounding boxes that fit a drag area W in which $$N = \frac{W}{w_0},$$

program instructions to find a gap between boxes using $$dw = \frac{W}{N},$$

and
program instructions to constrain the propagated bounding boxes using $x_i = x_0 + i*dw$ subject to $y_i = y_0$;
program instructions to inverse the normalization of the image; and
program instructions to output a labeled image.

14. The computer system of claim 13, wherein the normalization of the image applies pre-processed spatial distortion of the image to conform the image to fit the prior knowledge.

15. The computer system of claim 13, wherein a parameter of the pre-trained object detector is learned on a second labeled image dataset for getting a set of locations of a set of bounding boxes.

16. The computer system of claim 13, further comprising:
program instructions to remove one or more outlier detections from the set of detected objects based on the histogram.

17. The computer system of claim 13, wherein the program instructions to output the labeled image comprise:
program instructions to send the labeled image to a user computing device.

* * * * *